United States Patent [19]

Henig

[11] 3,960,262
[45] June 1, 1976

[54] ACCUMULATING CONVEYOR

[75] Inventor: Seymour Henig, Kensington, Md.

[73] Assignee: American Chain & Cable Company, Inc., Bridgeport, Conn.

[22] Filed: Nov. 29, 1974

[21] Appl. No.: 528,214

[52] U.S. Cl. .......................... 198/127 R; 29/116 R; 193/37
[51] Int. Cl.² ................................ B65G 13/02
[58] Field of Search .......... 198/127 R, DIG. 19; 193/37; 29/116 R, 125, 129.5

[56] References Cited
UNITED STATES PATENTS

| | | | |
|---|---|---|---|
| 1,711,245 | 4/1929 | Ohmer | 29/125 X |
| 1,900,150 | 3/1933 | Anderson | 198/DIG. 19 |
| 2,765,065 | 10/1956 | Liebelt | 198/127 R X |
| 3,001,682 | 9/1961 | Carroll et al. | 29/125 X |
| 3,170,561 | 2/1965 | Schneider | 198/127 R |
| 3,327,837 | 6/1967 | Covell | 198/127 R |
| 3,605,990 | 9/1971 | Cowen | 198/127 R |
| 3,729,088 | 4/1973 | Stein et al. | 198/127 R |

Primary Examiner—John J. Love
Assistant Examiner—Douglas D. Watts
Attorney, Agent, or Firm—Barnes, Kisselle, Raisch & Choate

[57] ABSTRACT

An accumulating roller conveyor system comprising a first tail end section which delivers the articles at a more rapid speed to an intermediate accumulating section wherein successive portions of the conveyor are disengaged upon movement of an article over a downstream portion and a drive section which is operable to stop articles and brake their movement.

29 Claims, 24 Drawing Figures

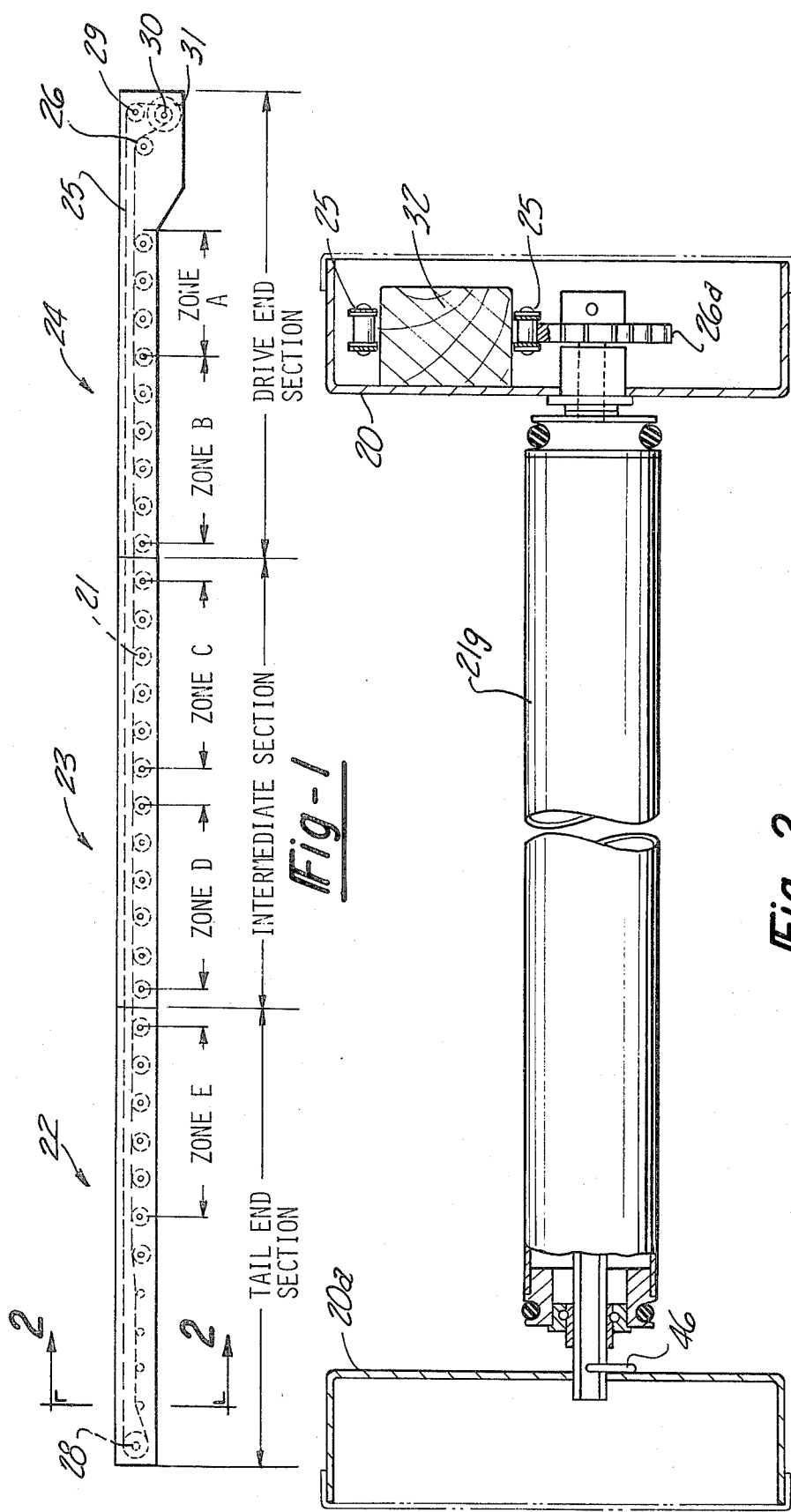

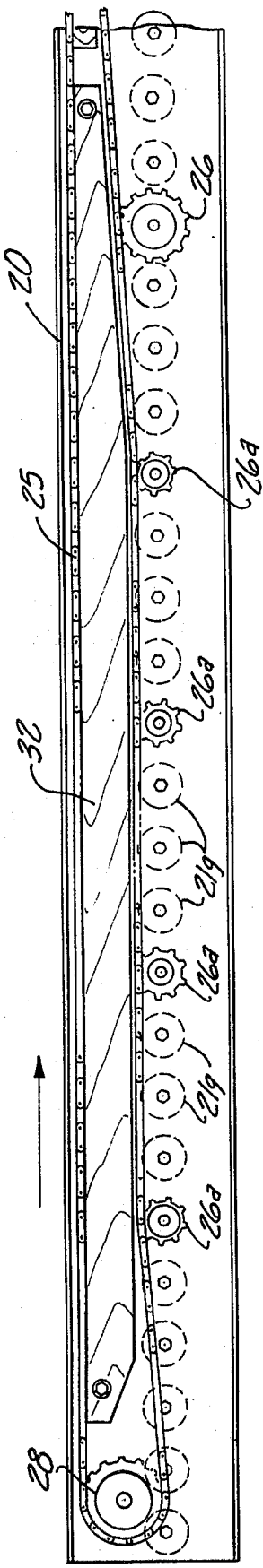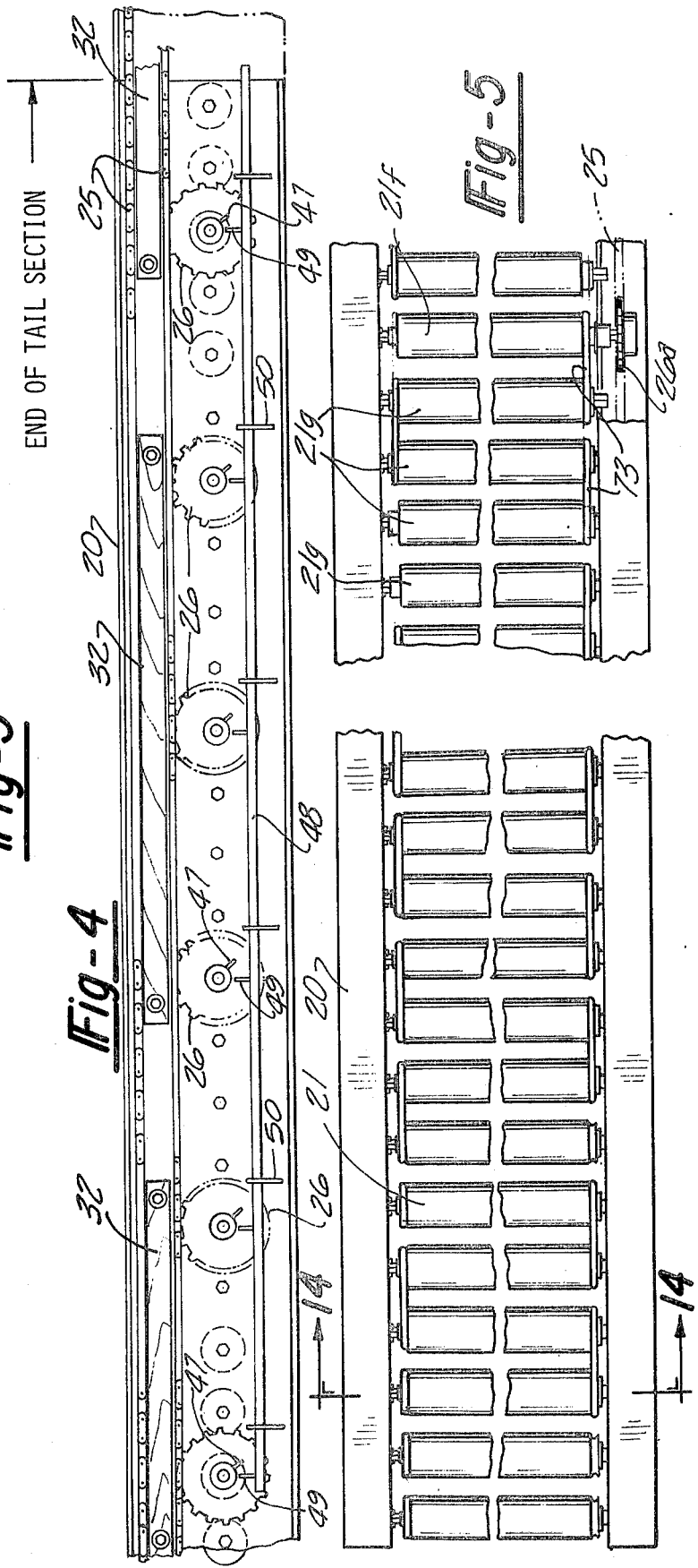

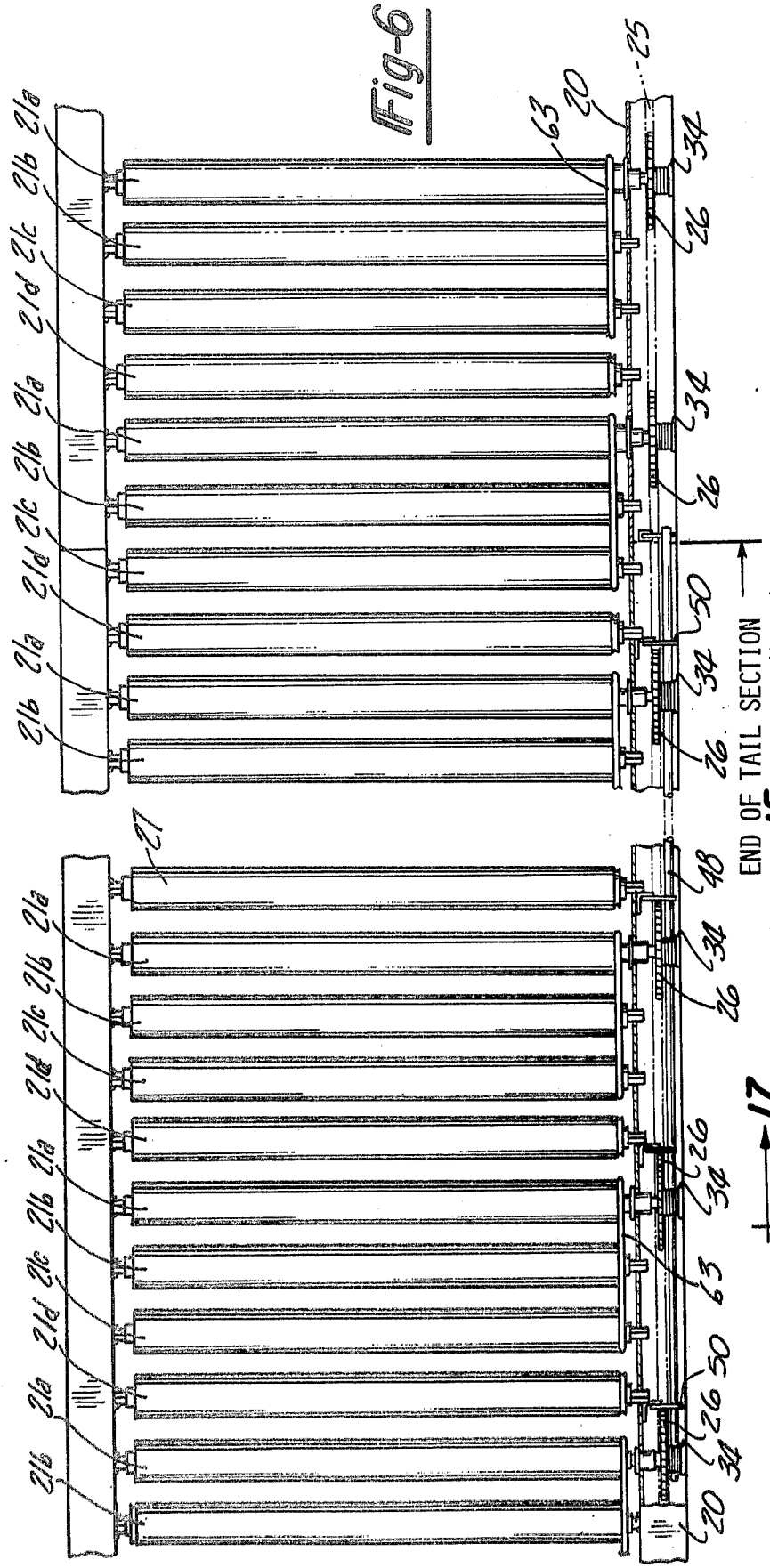

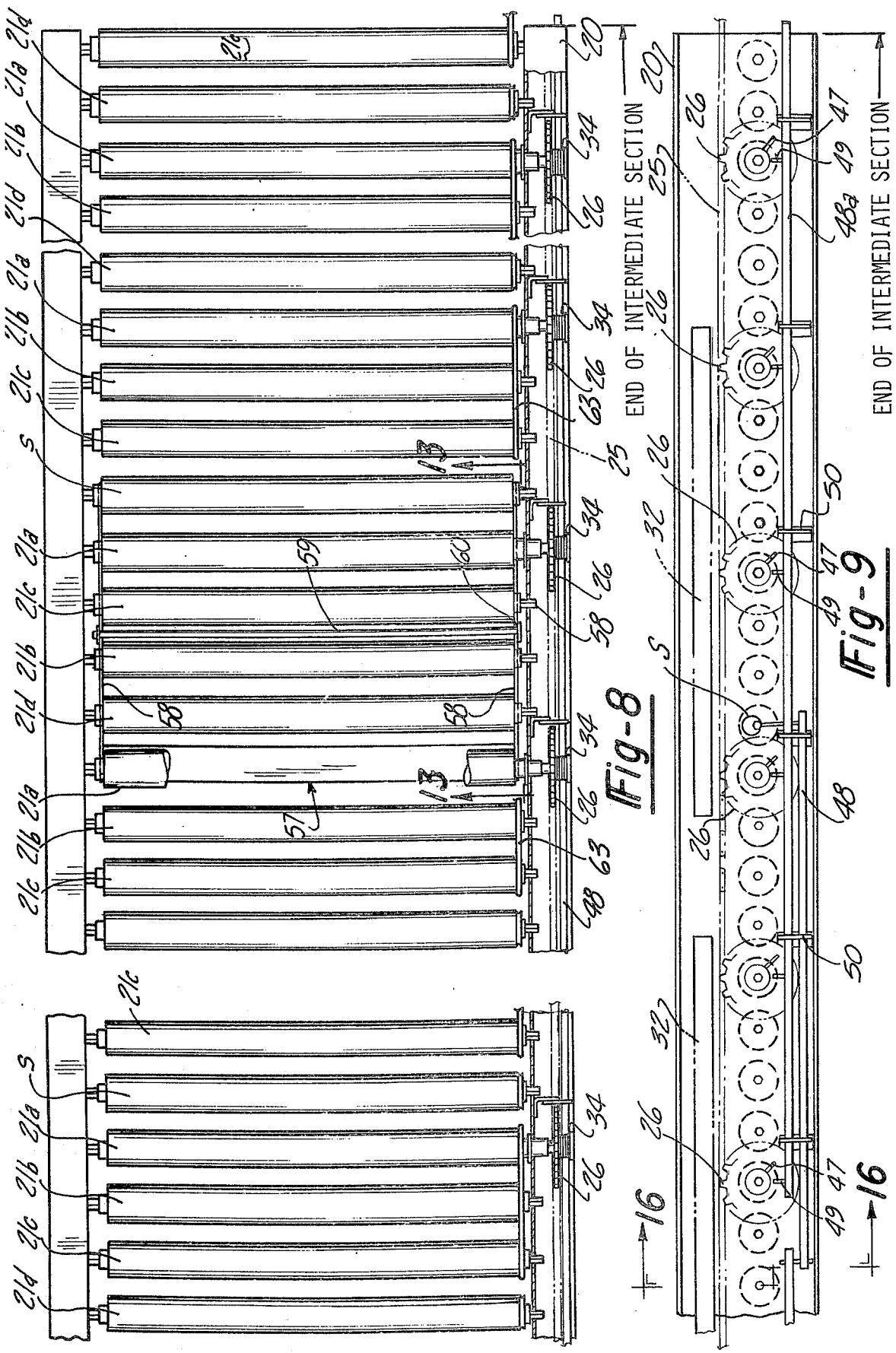

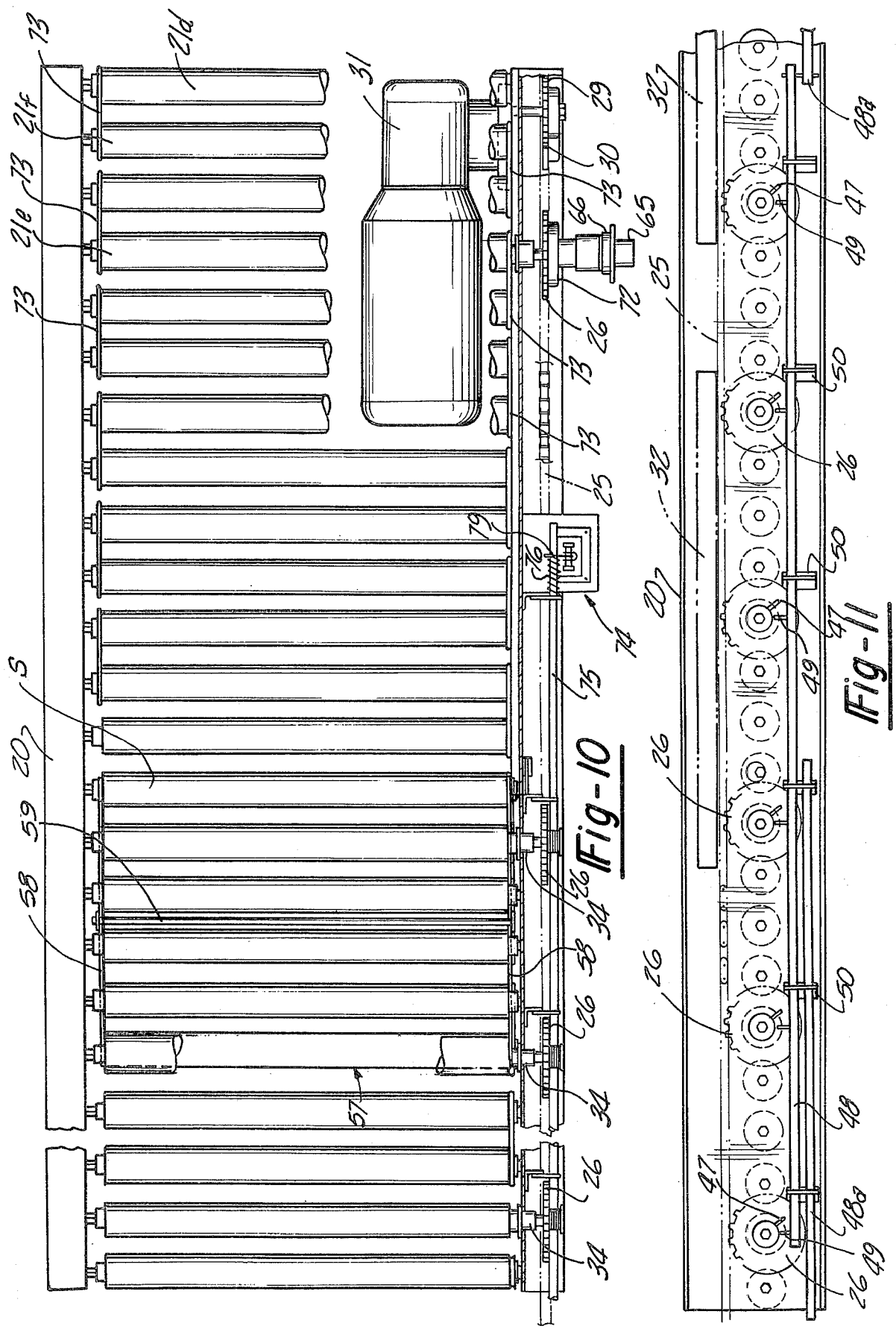

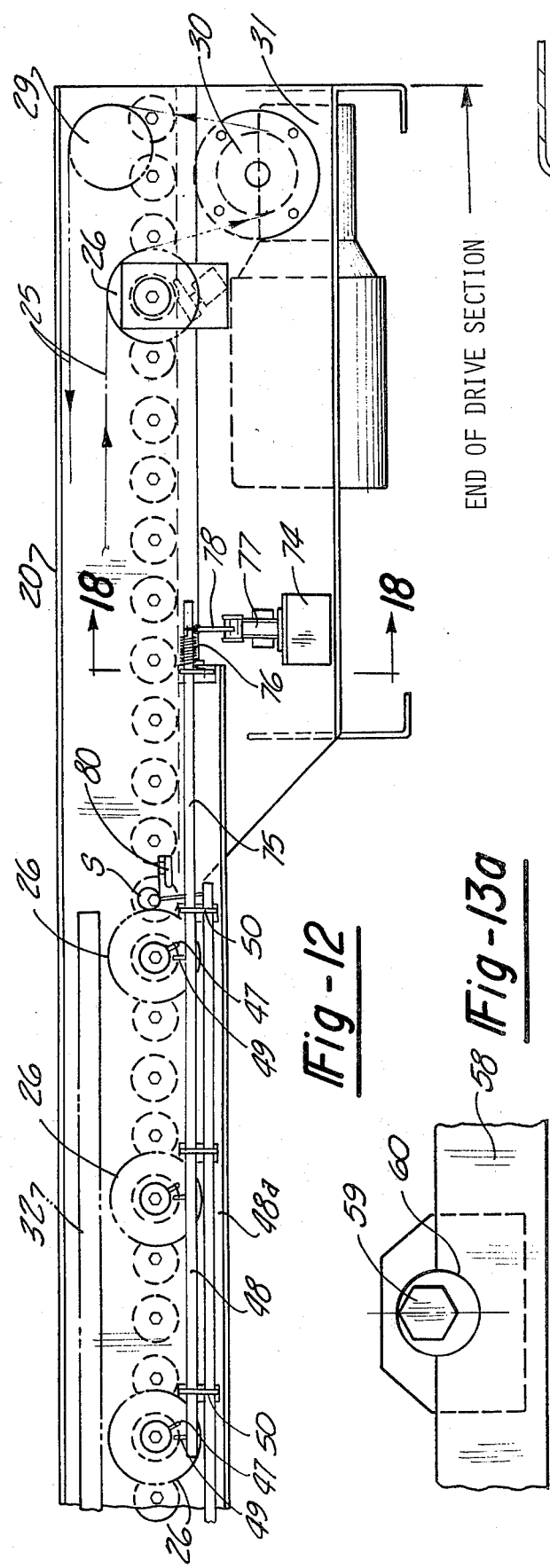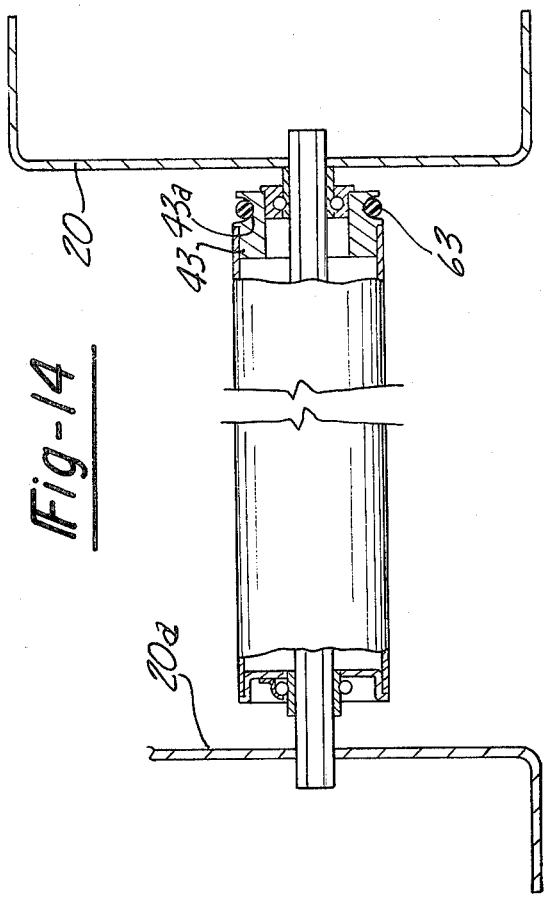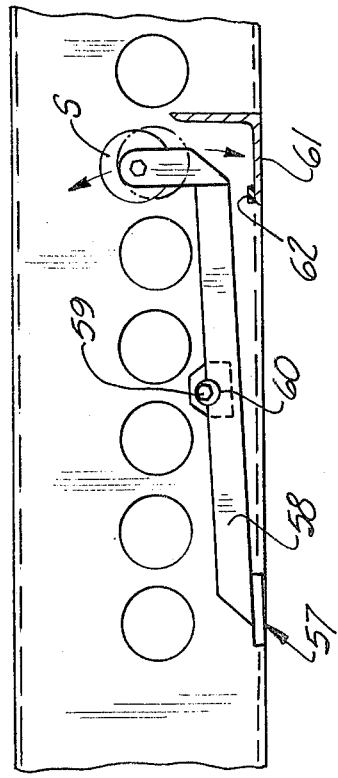

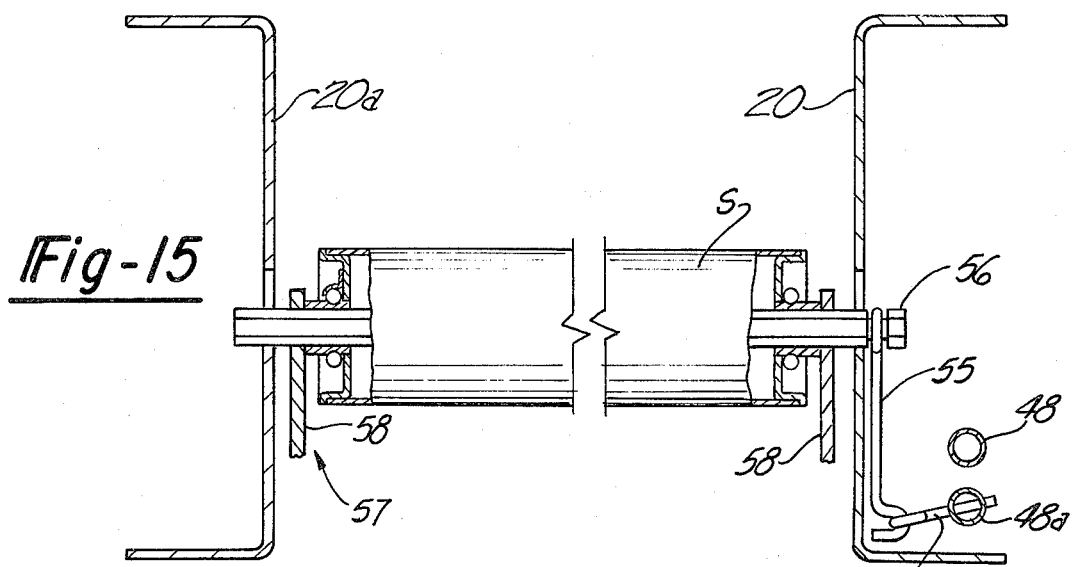
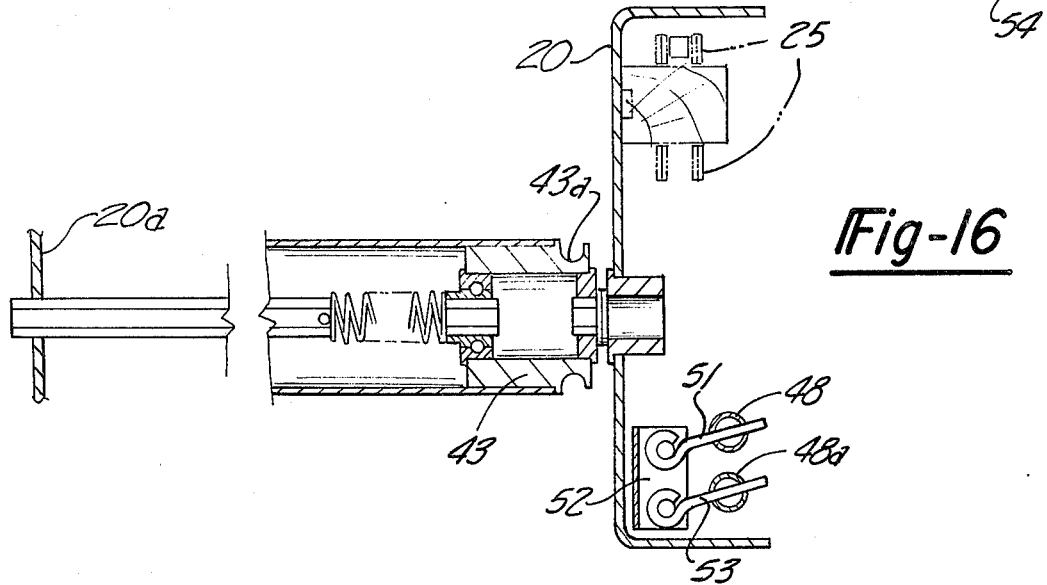
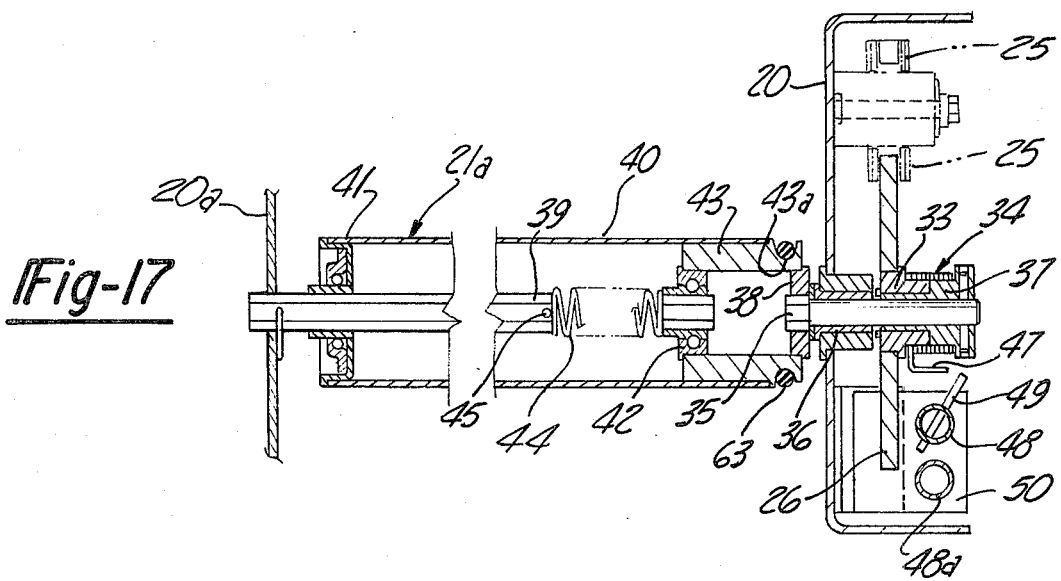

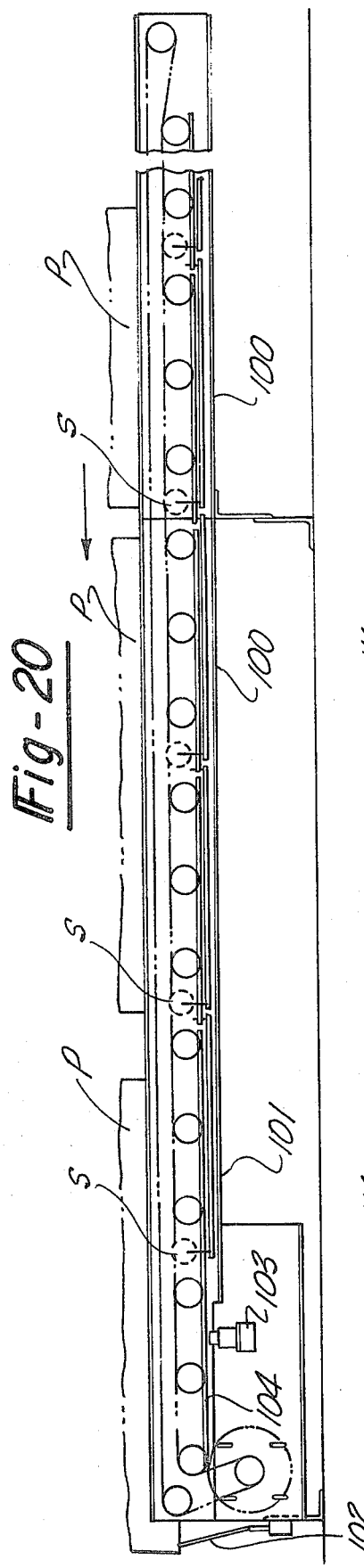
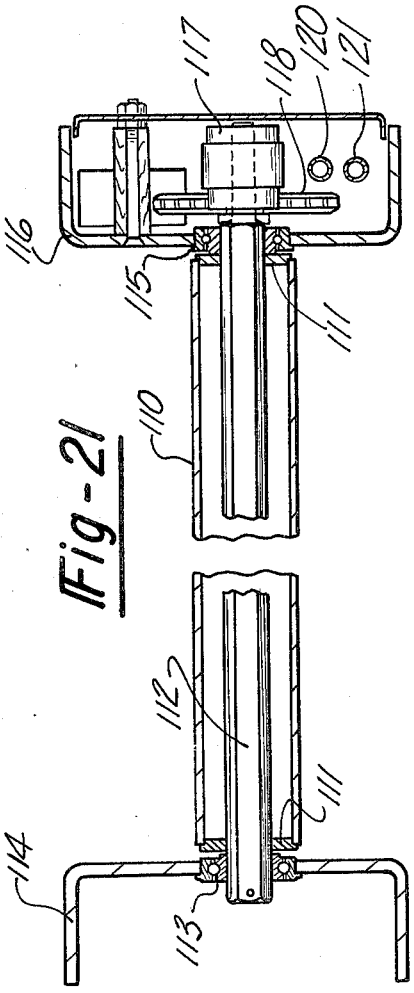
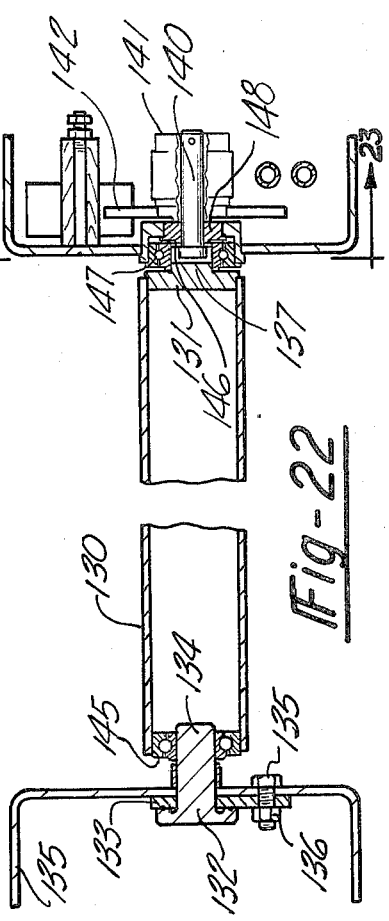
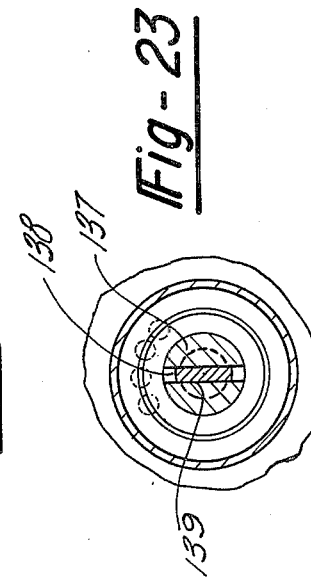
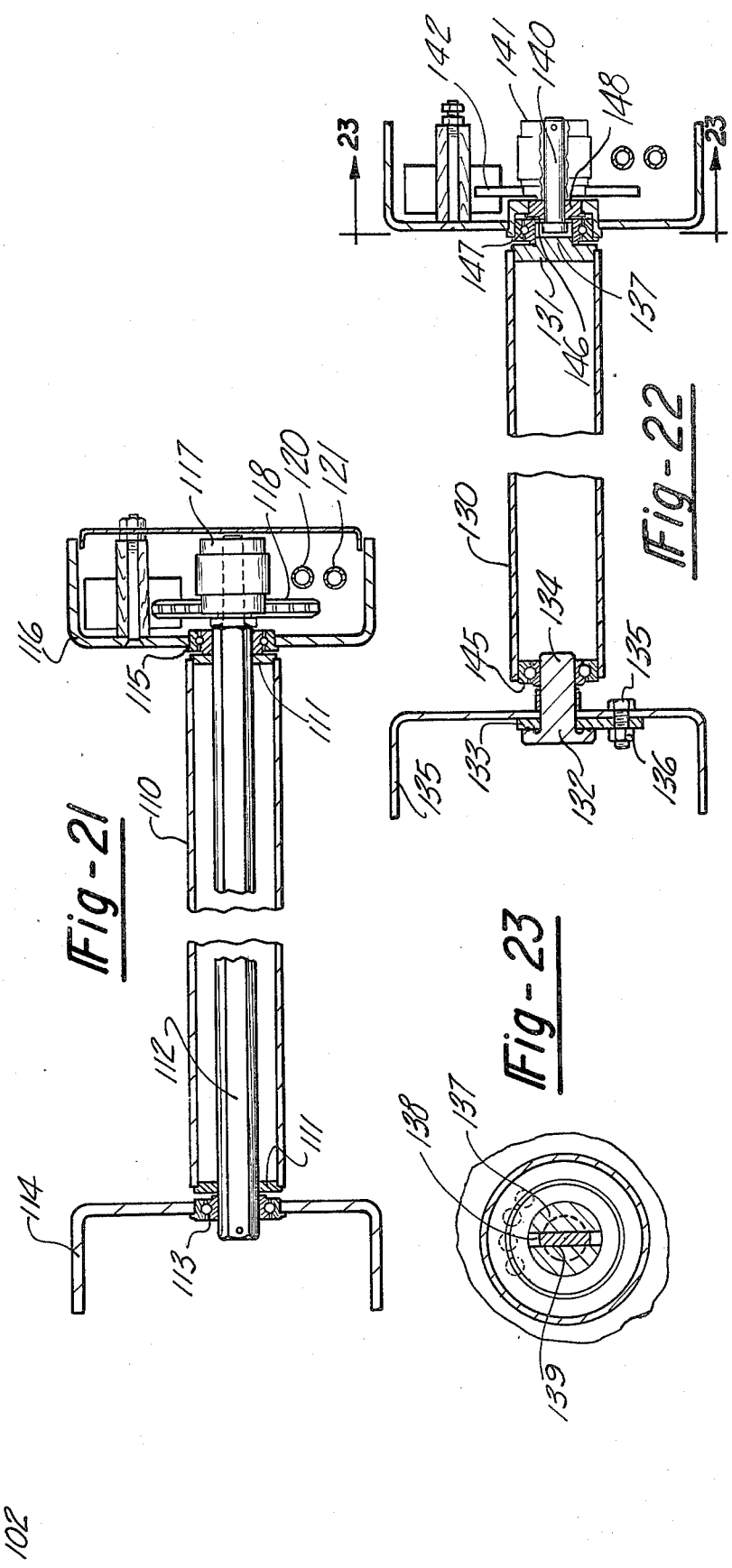

ACCUMULATING CONVEYOR

This invention relates to accumulating conveyor systems.

BACKGROUND OF THE INVENTION

There is a widespread industrial need to provide controllable temporary storage of packages or similar articles. Where this kind of surge or buffering requirement can be filled by using roller conveyors, it then becomes necessary to stop the flow without damaging any articles or packages. Damage can be avoided if collisions or impacts on each other are avoided when packages are brought to a stop, and if package line pressure is avoided after a closed-gap queue of stopped packages is formed-up and waiting. On the other hand, it is desirable to close gaps in order to conserve conveyor space. Thus, an accumulating conveyor system should be impact-free, gap-free, and should permit no line pressure in its handling of articles or packages.

To avoid line pressure build-up in a standing queue of articles on a roller guideway accumulator, driving force on these articles is removed at the point each added article is stopped. This is done by disengaging or declutching rollers from their driving medium. When these rollers are declutched, they are put in a coast (or free-wheeling) mode. Such a coast mode can be effected for a section of rollers upstream of the last package in a queue by placing a sensor a given distance downstream of the rollers being controlled. When each drive roller is individually controlled by its own downstream sensor, a fairly constant length section of coast-mode rollers will be provided at the upstream end of the queue, and this section will automatically move upstream. This downstream sensor arrangement, through its coast-mode section, provides the benefit of eliminating or reducing any impact of each new package adding to the end of the queue. With consistent size and weight packages, coasting distance would be fairly consistent, so that a downstream-sensor kind of accumulator theoretically could be designed or adjusted to practically eliminate both impact and line pressure.

Where it is desired to handle material such as break-bulk freight, package sizes and weights are variable and package surfaces can be expected to have variable friction characteristics on any given set of rollers. These factors contribute to differing coasting distances among different articles. Consequently, some impacts and some gaps, both variable may occur between these packages even in the case of an individual-control, downstream-sensor roller accumulator.

In the zone-control accumulators, where a number of drive-rollers are operated by a single downstream sensor to comprise a zone, another factor of variability is introduced because the sensor can be operated by a large or small package and the package can be mostly downstream or mostly upstream of the sensor. Here the available coast-mode length of conveyor is variable instead of fairly constant. Thus small packages in relatively large zones can be expected to yield gaps in some proportion to the disparity between the size of the package and the size of the zone.

Some prior types of conveyor systems utilize belt drives and pressure rollers for clutching and disengaging the drive rollers. This method requires adjustment for setting the pressure rollers and this adjustment may be a compromise between clutching and disengaging where the latter might be accompanied by residual driving force which produces line pressure build-up.

Some types of these systems use a pressure-air method of actuating in which the inflation of a bladder moves a frame supporting a set of rollers. In one type the pressure rollers are moved. In another type the load rollers are moved.

In these pressure-air actuation methods, the systems use air valves in conjunction with sensor rollers to detect packages. Such valves may prove to be unreliable. In addition, in one system the sensor roller is pivoted at one end of its shaft, while the other end is supported by a spring-loaded member of the valve, so that the roller is canted when no package is on it. If lightweight packages are not directed to pass down the valve side of the conveyor, force on the valve may be negligible, and sensing action may be unreliable according to our experience. In addition, this sensing action may be hampered by binding of the roller shaft in its vertical guide slot.

Another problem with respect to prior art accumulating systems is that it has been necessary to provide continual drive to the rollers in the area where the packages or articles are stopped. As a result, scuffing or wear on the packages may occur.

Accordingly, among the objects of the invention are to provide a roller conveyor system wherein a plurality of zones or areas are automatically declutched upsteam from a stopped article; wherein adjustment for package weight is not required; wherein differing transport speeds are provided in separate zones; and which incorporates a brake type package stop device.

SUMMARY OF THE INVENTION

In accordance with the invention, the roller conveyor comprises a plurality of areas or zones upstream from respective sensing positions which are automatically and positively declutched when an article is stopped.

In addition, the system incorporates areas or zones of varying speed, a stop zone wherein the roller drive is stopped and braked, and restart area or zone between the stop zone and the accumulating zone.

DESCRIPTION OF THE DRAWINGS

FIG. 1 is a side elevational view of a conveyor system embodying the invention.

FIG. 2 is a sectional view on an enlarged scale taken along the line 2—2 in FIG. 1.

FIG. 3 is a fragmentary part sectional view on an enlarged scale of the left-hand portion of the conveyor shown in FIG. 1.

FIG. 4 is a view on an enlarged scale of a successive portion of the conveyor shown in FIG. 3.

FIG. 5 is a fragmentary plan view of the portion of the conveyor shown in FIG. 3.

FIG. 6 is a fragmentary plan view of another portion of the conveyor.

FIG. 7 is a fragmentary side elevational view of the portion of the conveyor shown in FIG. 6.

FIG. 8 is a fragmentary plan view of another portion of the conveyor.

FIG. 9 is a fragmentary side elevational view of the portion of the conveyor shown in FIG. 8.

FIG. 10 is a fragmentary plan view of another portion of the conveyor.

FIG. 11 is a fragmentary side elevational view of the portion of the conveyor shown in FIG. 10.

FIG. 12 is a fragmentary side elevational view of another portion of the conveyor shown in FIG. 10.

FIG. 13 is a fragmentary side elevational view of a portion of the conveyor taken along the line 13—13 in FIG. 8.

FIG. 13a is a fragmentary view on an enlarged scale of a portion of the conveyor shown in FIG. 13.

FIG. 14 is a part sectional view taken along the line 14—14 in FIG. 5.

FIG. 15 is a fragmentary sectional view taken along the line 15—15 in FIG. 7.

FIG. 16 is a fragmentary sectional view taken along the line 16—16 in FIG. 9.

FIG. 17 is a fragmentary sectional view taken along the line 17—17 in FIG. 7.

FIG. 20 is a partly diagrammatic side elevational view of a modified form of the system.

FIG. 21 is a transverse sectional view of a modified form of roller and roller mount.

FIG. 22 is a further modified form of roller and roller mount.

FIG. 23 is a fragmentary sectional view taken along the line 23—23 in FIG. 22.

Figures 18, 19:
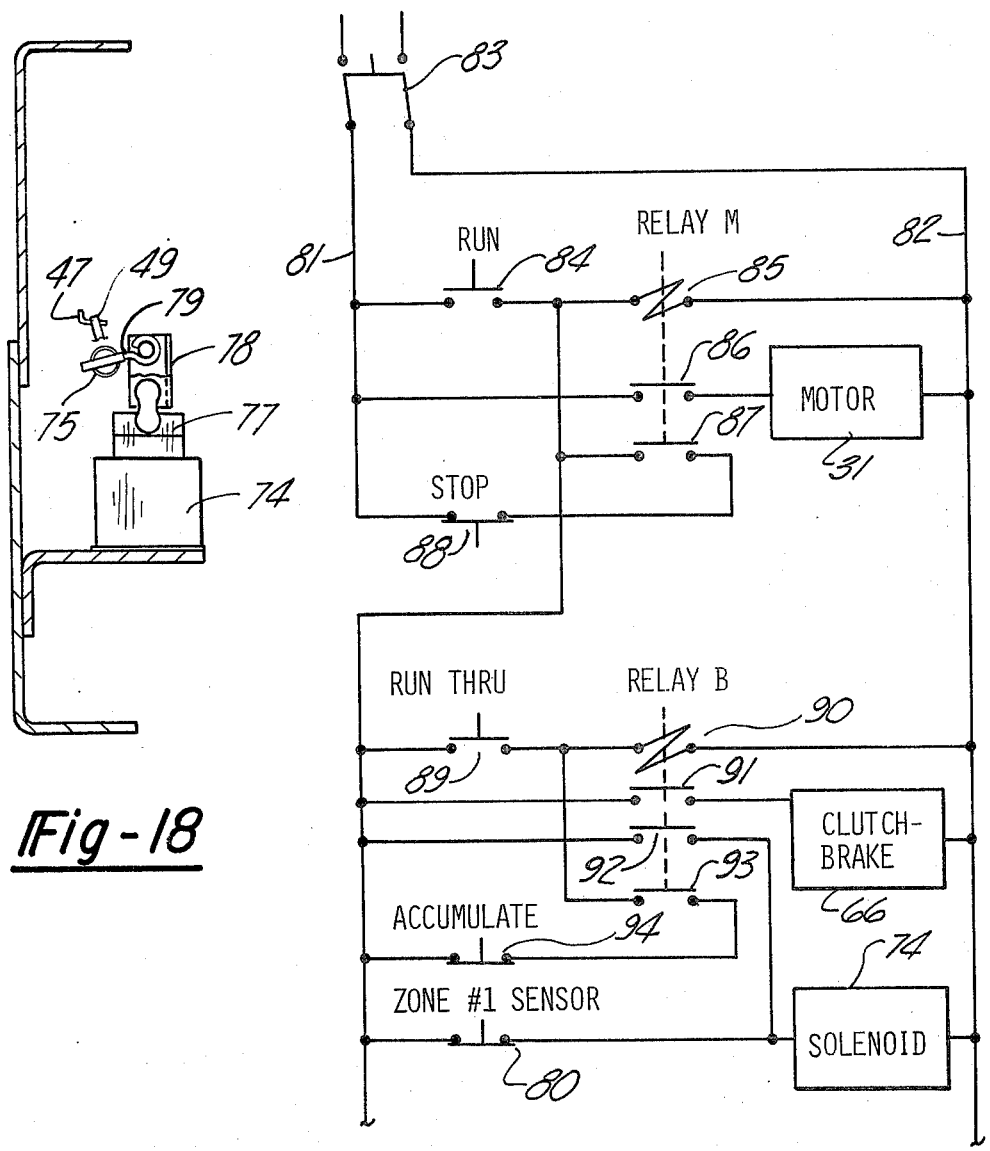
FIG. 18 is a fragmentary sectional view taken along the line 18—18 in FIG. 12.
FIG. 19 is an electrical control diagram of the conveyor system.

GENERAL DESCRIPTION
ACCUMULATING SECTION

The invention comprises an automatic zone-controlled live roller accumulating conveyor system. The system generally comprises a guideway with an effective continuum of drive rollers. Generally, the invention comprises a pair of frame members 20 which may be made of several sections that rotatably support a plurality of transversely extending longitudinally spaced rollers 21. As shown in FIG. 1, the system preferably includes an upstream tail end section 22 that delivers articles at a rapid speed to one or more zones in an accumulating section 23 and, finally, to a drive end section 24. At least some of the rollers are driven by an endless chain 25 which, in turn, is driven as presently described and has one reach thereof engaging sprockets 26 for driving the rollers.

Referring to FIGS. 6-8, in the accumulating section 23 at least one stopped-package sensor S is provided (FIG. 7) for controlling and operating the declutching on one or more upstream rollers 21, as presently described. When this sensor S is placed at the downstream end, or at a point even further downstream, of a section of drive rollers 21 which this sensor controls, the section will automatically be put into a coast (freewheeling) mode or a drive mode in accordance with the presence or absence, respectively, of a package resting on this sensor. The interposing of a coast section between the upstream driving section(s) and the downstream stopped package(s) permits a next package to decelerate and thus reduce its impact on the stopped package(s). At the same time, the complete declutching of the rollers underneath an accumulation of stopped packages prevents line-pressure build-up.

Sensor-controlled sections will automatically restart one after the other after the first downstream section is permitted to restart, because, in turn, each package resting on a sensor is driven off by adjacent drive rollers which have been re-engaged by the freeing of their own sensor (downstream).

As indicated above, a single chain loop 25 has one side in tangential engagement with sprockets 26 and, another side which returns freely. The chain 25 is trained at one end of the conveyor around a tail idler sprocket 28, and at the other end is trained around both a head idler sprocket 29, a drive sprocket 30 affixed to the shaft of an electric motor-reducer 31 and the first roller driving sprocket 26a. Low friction separators 32 such as wood (maple) strips (FIG. 4) serve both to keep the drive side of the chain 25 from disengaging from the roller-driving sprockets 26 and to slidably support the slack (return) side against forming an undesirable catenary.

As shown in FIG. 17, each roller-driving sprocket 26 is affixed to the input member 33 of an on-off tang-operated, spring clutch assembly 34, typified by that kind of product manufactured by Precision Specialties, Inc. (No. PSI-4, Mod SS, SPCL). A roller-driving spindle 35 passes through a support bearing 36 and then into the opening in output member 37 of the clutch assembly to which the spindle 35 is secured. The support bearing 36 is mounted through the wall of the frame-rail 20 which comprises one lateral side of the conveyor guideway. The inboard end of the spindle 35 is driveably shaped, such as hexagonal, in cross-section, and removably engaged, via a mating hole, to a drive plug 38 fixed in the end of a drive roller assembly 21a.

The drive roller assembly is easily removable because it incorporates a spring-loaded telescoping shaft 39 which cooperatively is supported and supports the roller tube 40 by plug ball bearings 41, 42 at or near each end. One end of the shaft 39 extends into an opening in the opposite side framerail 20a and the other end of this dead shaft 39 slidably engages in its bearing 42 which, in turn, is mounted in a second plug 43. This second plug 43 is a structural accommodation to fit the roller tube 40, hold plug bearing 42, hold drive plug 38, and form a pulley 43a for a slave drive belt. Spring 44 is interposed between a pin 45 and bearing 42 and urges the shaft 39 continuously outwardly, so that after coupling the drive end of this roller assembly 21a to the spindle 35, the end of projecting shaft 39 may be compressed and a pin 46 inserted in a hole exposed in this shaft on the inboard side of the second supporting frame-rail 20a. In this way, the driving end of the drive roller 21a is continuously urged to maintain its coupling with its spindle 35.

The spring clutch 34 is operated for disengagement by interfering with the rotation of a spring tang 47; removing the interference causes self-reengagement. This operation is effected for a number of clutches 34 simultaneously by a rotatable control tube 48 with an alignment of radially projecting pins 49, one for each tang 47. The control tube 48 is rotatably mounted on a frame 20 by brackets 50 close to the clutches 34 with its axis perpendicular to the axes of the clutches 34 so that rotation of the tube 48 will bring the ends of the pins 49 into the orbits of the tangs 47. This direct-acting control tube 48 is coupled through a crank arm 51 at the downstream end, a connecting link 52 and a second crank arm 53, to a remote-operating control tube 48a whose upstream end holds the second crank arm 53. The downstream end of this remote-operating control tube 48a holds a third crank-arm 54 which, by link 55 connects directly to the dead shaft 56 of a sensor roller S. The displacement of a sensor roller S thus can be transmitted to operate a number of clutches 34 in a section upstream of the section containing the sensor S.

Referring to FIGS. 13 and 15, the sensor roller S is mounted in a frame 57 comprising spaced arms 58 which are pivotally mounted on a bar 59 that is mounted between frame members 20, 20a. Bar 59 extends through enlarged openings 60 in arms 58 at a position in arms 58 to provide a calculated amount of over-balance for the weight of the roller. The bar 59 is polygonal in cross section and is positioned so that a corner defines a knife edge engaged by the openings 60 (FIGS. 13, 13a). Therefore, a set minimum weight package, with any part resting on the sensor roller S, displaces this roller S from its upper position above the plane of the guideway to its lower position in the plane of the guideway. Since this linkage inherently has little friction loss and small total displacement, and since interference with the clutch spring tangs 47 requires no maintaining force, the minimum weight package may be very small and nevertheless provide all the force and displacement required to operate a number of clutches 34. Heavy packages do not have any undesirable effect on the control linkage's operation because the excess force produced is supported by a cross member 61 which engages the frame 57. Cross member 61 supports rubber pads 62 which are engaged by frame-arms 58 to reduce noise.

As shown in FIGS. 6–9, the zone-controlled guideway is composed of a progression of rollers in which the first is a sprocket drive roller 21a, a second is an idler roller 21b, a third is a slave roller 21c, and a fourth is an idler roller 21d. This arrangement is an economic accommodation to minimize the use of the clutches and spindles. Other arrangements might use the sprocket, clutch and spindle for each roller, or might increase the use of idlers, or might drop the use of slaves. However, in this arrangement, rollers 21b, 21c, and 21d, other than a roller 21a, have a plug 43 with a pulley groove 43a inserted in one end of the roller tube so that both slaves and idlers may use a plug identical to plug 43 and otherwise may be of identical construction (FIG. 16). Thus a slave drive roller 21c and sprocket drive roller 21a are coupled with a belt which passes over the aligned groove of an idler roller 21b between the other two. The sensor S is located at an idler position outside of the belt coupled pair so that it freely can make its vertical displacement. Only one sensor S is needed for each controlled zone. When a sensor S is not provided between sets of rollers 21a, 21b, 21c, an idler roller 21d is provided.

DRIVE END SECTION

The drive end section includes a package stop zone and an area upstream thereof adjacent the accumulating zone. Referring to FIGS. 10–12 and 17, the package stop incorporates a section of guideway rollers which can be disengaged from the drive and braked to the structural ground through electrical control. A drive roller 21e, similar to the aforementioned drive rollers 21a except for including, optionally, pulley grooves at both ends, as shown in FIG. 2, and a lagged face, engages a drive spindle also similar to the aforementioned spindles 35. This spindle also passes through a support bearing in the frame rail; then the spindle extends into an opening and is secured to the output member 65 of a clutch-brake component 66 such as that manufactured by Precision Specialties, Inc. (No. CB-5). A package stop drive sprocket 26 engaged by the transmission chain 25 is affixed to the input member 72 of this component 66. This drive roller 21e is a master roller relative to slave rollers 21f successively belt driven, each in turn, by virtue of pulley grooves at each end and pairing with belts 73 at alternating opposite ends. These slave rollers 21f, also optionally, have lagged faces, and they also are disposed both upstream and optionally downstream of their master. Since braking force deriving from each slave will diminish as their number increases away from their master, because of compounding belt slippage, the upstream slaves will impart a graduated deceleration to a package driven onto this section. The rollers in this section do not coast; they are either driven or braked, as these are purposefully controlled.

The above clutch-brake component 66 operates so that when energized, the clutch is engaged and the brake is not; and when deenergized, the brake is engaged and the clutch is not.

The section of guideway just upstream of the package stop section is similar to other zone-controlled areas except that it is operated for drive or coast through a solenoid actuator 74 coupled to a direct-acting control tube 75. The latter tube performs as described earlier (FIGS. 10, 18).

The objective here is to provide a means of positively restarting those first packages upstream of the package stop while improving over conventional systems wherein a section of rollers between the package stop and the first zone-controlled section is continuously driven without any coast mode. Continuously driving the rollers adjacent to the first sensor S which is located just upstream of the package stop assures that a package resting on the sensor S will be driven off when the stop is deactivated. However, without any coasting here, the first packages may impact on each other and then be abraded on their bottoms by the running rollers.

In addition to the solenoid actuator 74, mentioned above, used in our restart section, the control tube 75 is urged by a spring 76 so that the pin 49 on tube 74 normally orients to disengage the clutches 34 to put the rollers in a coast mode. The armature 77 also is extended by this spring 76, since the armature 77 is coupled by a link 78 to a crank-arm 79 attached to the control tube 75. Energizing the solenoid 74 pulls in the armature 77 against the action of spring 76 and rotates the pins 49 to permit the clutches 34 to self-engage for a drive mode of the rollers.

Further in addition, a normally-closed electrical switch 80 is mounted to be operated by the first sensor S so that the switch 80 opens when the sensor S is displaced to its lower position.

Thus when it is desired to load the accumulator, the package stop component 66 is deenergized to set its brake. The first package(s) will be driven onto the braked roller section because the preceding upstream zone will be in a drive mode by virtue of the solenoid 74 being energized through its closed sensor switch 80. Eventually a package will come to rest on the first sensor S, opening the sensor switch 80, deenergizing the solenoid 74, and putting this zone in a coast mode.

The accumulator then may fill up in the manner described earlier. Then when it is desired to unload the accumulator, the package stop component 66 is energized together with solenoid 74 which is circuited to bypass its open sensor switch 80 so that both package stop and restart section are in drive mode. the first sensor roller S will now be free to rise in any gap that opens up between packages driven off, and such sensor rollers' successive actions will serially start up and drive off packages in each controlled zone for the full length of the accumulator. Of course, if desired, the packages may be only partly run off, or run off intermittently simply by setting the brake at any point.

UPSTREAM TAIL END SECTION

A higher speed zone is provided with continuously running drive rollers at the furthest upstream end. The purpose of higher speed here is to assure that the preceding discharge chutes of sorting machines and the like are assisted to pass through packages where they might otherwise clog up.

The higher speed for these rollers 21f in the tail end section 22 is accomplished simply by using smaller sprockets 26a mounted directly on spindles and similarly driven by the same chain 25 that engages the zone controlled sprockets 26. No clutches are used here since continuous drive is the desired mode of operation. Slave drive rollers 21g are coupled to the drive rollers 21f by belts 73, similarly to the arrangement of the package stop section.

ELECTRICAL CONTROL DIAGRAM

Referring to FIG. 19, the electrical control diagram comprises power lines 81, 82 to which power is supplied from a switch 83 to a plurality of circuits including a run button 84 that controls a relay 85 and, in turn, controls contacts 86, 87, and a stop button 88, all controlling the drive motor 31.

The circuit further includes a run thru button 89 that provides an override control and a relay 90 having contacts 91, 92, 93, controlling the clutch-brake 66 and solenoid 74. An accumulate button 94 and zone sensor limit switch 80 are provided to the clutch-brake 66 and solenoid 74.

MODIFIED SYSTEM

Where heavy loads of substantially the same size are used such as loaded pallets P that are lifted from the delivery area, a modified form of the system such as shown in FIG. 20 can be used. The conveyor system shown in FIG. 20 comprises one or more accumulating sections 100 controlled by sensing rollers S as in the accumulating sections shown in FIGS. 6 and 7. A stop zone 101 is controlled by a limit switch 102 so that when the load P hits the limit switch, the drive to the rollers in the stop section 101 is interrupted by deenergizing a solenoid 103 that rotates a tube 104 controlling the drive to the rollers in the stop section 101. When the load P at the stop section is lifted or carried away, the swtich 102 energizes solenoid 103 permitting the rollers in the stop section to be driven once again so that the rollers upstream will also be driven to carry the next load toward the stop zone.

MODIFIED FORM OF ROLLERS AND ROLLER MOUNT

A modified form of rollers is shown in FIG. 21 and comprises a roller 110 that is hollow and has end caps 111. A shaft of non-circular cross section 112 extends through the roller and at one end through a bearing 113 press fitted in an opening in the frame member 114. At the other end, the shaft extends through a ball bearing 115 press fitted in frame 116. The driven rollers carry a spring-operated clutch 117 like that in the previous forms of the invention as well as sprockets 118. The sprockets are driven by a chain as in the previous form of the invention and tubes 120, 121 are interconnected in the same manner as tubes 48 of the previous forms of the invention to provide multiplexing control.

In the form of the invention shown in FIGS. 22 and 23, the roller 130 has an end plug stub shaft 131 at one end. A stub shaft 132 has a plate 133 welded thereto and a portion 134 extending through an opening in the frame 135' and into a bearing 145 which plugs the other end of roller 130. Plate 133 is maintained in position by a bolt 135 and nut 136 so that it is removable. At the drive end of the roller 130, the stub shaft 131 includes a projection 137 having a slot 138 therein for receiving the projection 139 of the output shaft 140 of the spring-operated clutch 141. The stub shaft 131 is supported by a bearing 147 and the clutch output shaft is supported by a bearing 148 and through a washer 146 by the bearing 147. The input to the clutch is through a sprocket 142 as in the previous form of the invention.

It can thus be seen that the conveyor system will function as a buffer, or temporary holding and segregating medium, for sorted discrete articles between a sorting machine's discharge and another conveyor (or series of conveyors) to a next function such as loading a vehicle.

A variation of this conveyor will function to enable control of sorted article traffic, when the conveyor is a transport guideway, by stopping one serial batch of articles to permit another batch to enter the guideway and gain enough headway to keep the batches integral, or separate from each other.

It is implicit in accumulating to cause a stoppage or slow-down in the transport of articles and it is a primary purpose here to cause such stoppage while minimizing the effects of impact and line pressure build-up from subsequent articles serially adding to a queue started by stopping a first article, and also while substantially closing the gaps between articles in the queue.

The new design thus features multiplexed declutching by an entirely mechanical method, or by an electromechanical method, or by a combination of both methods on the same conveyor to attain specific operating characteristics which will be described. The clutching and sensing methods do not require adjustments for package weight ranges. The method of driving the conveyor permits differing transport speeds in separate zones and a brake type package stop rather than the interference type which may upset a package.

I claim:
1. In a roller conveyor, the combination comprising a plurality of transversely extending rollers,
means for rotatably supporting said rollers in parallel longitudinally spaced transversely extending relation to one another,
endless chain means for engaging at least some of said rollers and rotating said rollers,
said rollers comprising a first tail end section comprising a plurality of said rollers,
a second accumulating section comprising a plurality of rollers,
and a third drive section comprising a plurality of rollers,
at least some of said rollers in said accumulating section including a self-energizing clutch associated therewith including an input member rotat- able about the axis of the roller and driven by said chain means, an output member fixed to said roller, and spring means normally interengaging said input and output members and actuatable to disengage the input and output members, a sensor projecting upwardly normally into the path of an article moving along said rollers in said accumulating section, said sensor being movable downwardly upon movement of an article thereover, and means mechanically connected to said clutches and operable upon depression of said sensor directly to engage said spring means and to cause disengagement of said clutches.

2. The combination set forth in claim 1 wherein said clutch includes a spring wrapped about a shaft and having a free end, said means mechanically connected to said sensor and responsive directly to movement of said sensor to engage said free end to disengage said clutch.

3. The combination set forth in claim 1 wherein said means operable upon depression of said sensor comprises a member mounted for rotation along the axis of said conveyor, means operable upon depression of said sensor for rotating said member about its longitudinal axis, and means operable upon rotation of said member and movable into the path of said spring means of said clutch to disengage the clutch.

4. The combination set forth in claim 3 including a plurality of said longitudinally extending members rotatably mounted along the axis of said conveyor and movable in unison upon depression of said sensor.

5. The combination set forth in claim 3 wherein each said clutch driven roller comprises a shaft, said roller being rotatably mounted on said shaft, said shaft having an end engaging a frame, a second shaft fixed to said roller and extending through an opening in an opposite frame member, an input member, a clutch spring having one end thereof wrapped about said shaft and the other end thereof wrapped around said input member, a sprocket on which said input member is fixed, said spring having a free end extending into the path of a projection on said longitudinally extending member.

6. The combination set forth in claim 1 wherein said sensor comprises a roller, means for pivoting said roller such that it is biased upwardly into the path of the article.

7. The combination set forth in claim 6 wherein said means pivotably supporting said roller comprises a pair of levers and counterweight means associated with said levers.

8. The combination set forth in claim 7 wherein said pivot means includes a member having a transverse line contact and an opening in said lever engaging said last-mentioned member along said line defining a knife edge.

9. The combination set forth in claim 1 including a frame, each said roller comprising a stub shaft, a bearing in said frame for rotatably mounting said stub shaft in said frame, said roller including a hollow body with a bearing in the other end thereof, a second stub shaft removably mounted on said frame and engaging said bearing in said roller.

10. The combination set forth in claim 1 wherein said drive end section includes means connected to at least one of said clutch driven rollers and operable upon energization to engage said rollers and means operable upon disengagement of said last-mentioned clutch driven rollers to engage a brake on some of said rollers.

11. The combination set forth in claim 1 including a plurality of rollers intermediate said rollers of said accumulating section and said rollers of said drive section defining a stop section, clutches associated with at least some of said rollers providing a selective drive between the endless means and said rollers, means for normally disengaging said clutches, and means independent of said sensor operable when energized to actuate said clutches for engagement with said endless means such that when the clutches of said intermediate rollers are actuated, any article thereon is driven toward said stop section.

12. The combination set forth in claim 11 including means for actuating said last-mentioned means when said article is removed from said stop section.

13. The combination set forth in claim 1 including clutch actuating and brake means mounted on each drive roller of a downstream portion of said conveyor for disengaging the clutches adjacent to said last-mentioned portion to stop an article thereon, said means being such that when said article is removed, said drive to said clutches and, in turn, the rollers associated therewith is re-established.

14. In a roller conveyor, the combination comprising a plurality of transversely extending rollers, means for rotatably supporting said rollers in parallel longitudinally spaced transversely extending relation to one another, endless chain means for engaging at least some of said rollers and rotating said rollers, a plurality of groups of said rollers, a plurality of self-energizing clutches associated with each group including an input member rotatable about the axis of the roller and driven by said endless chain means, an output member fixed to said roller, and spring means normally interengaging said input and output members and actuable to disengage said input and output members, a sensor associated with each group of said clutches and projecting upwardly normally into the path of an article moving along said rollers downstream of said clutch with which it is associated, said sensor being movable downwardly upon movement of an article thereover, and means mechanically connected to said clutches and operable upon depression of said sensor directly to engage said spring means and to cause disengagement of said clutches.

15. The combination set forth in claim 14 wherein said clutch includes a spring wrapped about a shaft and having a free end, said means mechanically connected to said sensor and responsive directly to movement of said sensor to engage said free end to disengage said clutch.

16. The combination set forth in claim 14 wherein said means operable upon depression of said sensor comprises a member mounted for rotation along the axis of said conveyor, and means operable upon depression of said sensor for rotating said member about its longitudinal axis, and means operable upon rotation of said member and movable into the path of said spring means of said clutch to disengage the clutch.

17. The combination set forth in claim 16 including a plurality of said longitudinally extending members rotatably mounted along the axis of said conveyor and movable in unison upon depression of said sensor.

18. The combination set forth in claim 14 wherein said sensor comprises a roller, means for pivoting said roller such that it is biased upwardly into the path of the article.

19. The combination set forth in claim 18 wherein said means pivotably supporting said roller comprises a pair of levers and counterweight means associated with said levers.

20. The combination set forth in claim 17 wherein said pivot means includes a member having a transverse line contact and an opening in said lever engaging said last-mentioned member along said line defining a knife edge.

21. The combination set forth in claim 16 wherein each said clutch driven roller comprises a shaft, said roller being rotatably mounted on said shaft,
said shaft having an end engaging a frame,
a second shaft fixed to said roller and extending through an opening in an opposite frame member,
an input member,
a clutch spring having one end thereof wrapped about said shaft and the other end thereof wrapped around said input member,
a sprocket on which said input member is fixed,
said spring having a free end extending into the path of a projection on said longitudinally extending member.

22. The combination set forth in claim 14 including a frame, each said roller comprising a stub shaft,
a bearing in said frame for rotatably mounting said stub shaft in said frame,
said roller including a hollow body with a bearing in the other end thereof,
a second stub shaft removably mounted on said frame and engaging said bearing in said roller.

23. The combination set forth in claim 14 including a plurality of rollers defining a stop section downstream of said first-mentioned rollers, a plurality of rollers between said rollers of said accumulating section and said rollers of said stop section,
clutches associated with at least some of said rollers providing a selective drive between the endless means and said rollers,
means independent of said sensor for normally disengaging said clutches,
and means operable when energized to actuate said clutches for engagement with said endless means such that when the clutches of said intermediate rollers are actuated, any article thereon in driven toward said stop section.

24. The combination set forth in claim 23 including means for actuating said last-mentioned means when said article is removed from said stop section.

25. The combination set forth in claim 14 including clutch actuating and brake means mounted on each drive roller of a downstream portion of said conveyor for disengaging the clutches adjacent to said last-mentioned portion to stop an article thereon, said means being such that when said article is removed, said drive to said clutches and, in turn, the rollers associated therewith is re-established.

26. In a roller conveyor, the combination comprising a plurality of transversely extending rollers, means for rotatably supporting said rollers in parallel longitudinally spaced transversely extending relation to one another,
means for driving at least some of said rollers and rotating said rollers,
an accumulating section comprising a plurality of rollers,
a stop section comprising a plurality of rollers,
a sensor associated with some of said rollers and being actuatable upon movement of an article thereover,
and means operable on actuation of said sensor to cause disengagement of said drive to said rollers,
a plurality of rollers between said rollers of said accumulating section and said roller of said stop section,
clutches associated with at least some of said rollers between said accumulating section and said stop section providing a selective drive between the drive means and said rollers,
means for normally disengaging said clutches,
and means independent of said sensor and operable when energized to actuate said clutches for engagement with said endless means such that when the clutches of said intermediate rollers are actuated, any article thereon is driven toward said stop section.

27. The combination set forth in claim 26 including means for actuating said drive to said intermediate rollers when said article is removed from said stop section.

28. In a roller conveyor, the combination comprising a plurality of transversely extending rollers, means for rotatably supporting said rollers in parallel longitudinally spaced transversely extending relation to one another,
means for driving at least some of said rollers and rotating said rollers,
an accumulating section comprising a plurality of rollers,
a stop section comprising a plurality of rollers,
a sensor associated with some of said rollers and being actuatable upon movement of an article thereover,
and means operable on actuation of said sensor to cause disengagement of said drive to said rollers,
a frame,
each said roller comprising a stub shaft,
a bearing in said frame for rotatably mounting said stub shaft in said frame,
said roller including a hollow body with a bearing in the other end thereof,
a second stub shaft being removably mounted in said frame and engaging said bearing in said roller.

29. In a roller conveyor, the combination comprising a plurality of transversely extending rollers, means for rotatably supporting said rollers in parallel longitudinally spaced transversely extending relation to one another,
means for driving at least some of said rollers and rotating said rollers, an accumulating section comprising a plurality of rollers,
a sensor associated with some of said rollers and being actuatable upon movement of an article thereover,
means interposed between said driving means for driving said rollers,
and means operable on actuation of said sensor to cause disengagement of said last-mentioned means to said rollers,
a stop section downstream from said accumulating section and comprising a plurality of said rollers,
and combined clutch brake means driven by said drive means and mounted on said drive rollers of said last-mentioned rollers such that when the clutch is energized, a drive is provided to said rollers, and when said brake is energized, said roller movement is stopped.

* * * * *